No. 779,261.     Patented January 3, 1905.

UNITED STATES PATENT OFFICE.

HENRIETTE BREYER, OF KOGEL, NEAR NEU LENGBACH, AUSTRIA-HUNGARY, ASSIGNOR OF FOUR-FIFTHS TO ALFRED JURNITSCHEK VON WEHRSTEDT, OF CASTLE PUCHBERG, NEAR WELS, AUSTRIA-HUNGARY.

PROCESS OF PURIFYING SUGAR-JUICE.

SPECIFICATION forming part of Letters Patent No. 779,261, dated January 3, 1905.

Application filed August 25, 1904. Serial No. 222,142.

*To all whom it may concern:*

Be it known that I, HENRIETTE BREYER, a subject of the Emperor of Austria-Hungary, residing at Kogel, near Neu Lengbach, Lower Austria, Austria-Hungary, have invented certain new and useful Improvements in Processes of Purifying Raw Sugar-Juices or Diffusion-Juices, of which the following is a specification.

This invention relates to a process for purifying raw sugar-juices or diffusion-juices, said process having for purpose to reduce the quantity of the required lime, to accelerate considerably the saturation, to increase the purity of the juices, to diminish the required quantity of carbonic acid, and to facilitate the filtering operation. For attaining this purpose the raw juice or diffusion-juice heated to a temperature of about 80° centigrade is intimately mixed in the mixing-receptacle (malaxator) with a pulverulent purifying agent, whereupon it is saturated by forcing into the mixture carbonic acid in the direction from the bottom to the top. Through this blowing in of carbonic acid the pulverulent purifying agent which is added to the juice is maintained in a constant motion during the whole operation of saturation. The said purifying agent is composed of an intimate mixture of hydroxid of calcium in powder with brick-dust, the latter being prepared by reducing well-calcined bricks to powder. The proportion of the ingredients of this mixture is two parts of hydroxid of calcium to one part of brick-dust. To the heated raw or diffusion juice in the malaxator the said mixture is added in a quantity which is determined by analysis. A number of experiences has proved that in the majority of cases an addition of the pulverulent purifying agent in the same quantity in which until now lime has been added and which in all cases exceeds one per cent., by weight, of the beet-root will be sufficient to obtain by the said treatment clear juices, which are to a far greater extent exempt from impurities than the juices which have been treated after the purifying methods known hitherto. The said improved method, moreover, permits a precipitation of the impurities in a shape by far more favorable for the subsequent mechanical separation of these impurities from the filtered juice than when working according to the known methods—that is to say, the impurities are precipitated in denser masses and in the form of larger flocks. The saturation takes place very rapidly and without the formation of scum. The alkalinity is maintained at 0.06. After this first saturation a clear juice is obtained, which flows rapidly through the filter-presses, and the edulcoration of the sediment is effected in a more rational manner than with the ordinary working methods. The filtered juice is then heated to 90° centigrade and without the addition of lime is submitted to a second saturation until its alkalinity is reduced to from 0.01 to 0.009. The proportion of lime is then so small that the presence of the lime cannot be detected by ammonium oxalate. The juice produced in the above-described manner is then submitted to further treatment according to the ordinary methods.

I am fully aware that the employment of brick-dust has already been proposed for the purpose of purifying raw sugar-juices. (See the work of E. F. Maumené: *Traité Théorique et Pratique de la Sucrorie.*) The process described in this treatise proposes to effect the purification of the juices with a very small amount of lime (three to six thousandths) and in maintaining low temperatures not exceeding 60°, and it consists, essentially, in that brick-dust is added to the precipitates formed after the decantation of the juice, which is said to be clear. The addition of the brick-dust has for its only purpose to bring about an easier filtration. Now this process has proved to be absolutely impracticable, because a purification of the juice cannot be obtained when employing such small quantities of lime as are proposed by Maumené and the addition of brick-dust, if it is really performed in the manner indicated in the treatise, cannot contribute to the purification and decoloration of the juices. Only when an intimate mixture of hydroxid of calcium with brick-dust is added to the juices, as has been described in the preceding specification, and maintained in a permanent eddying motion by the carbonic acid introduced for the purpose of saturation, can a sufficient degree of purification of the juices answering to all requirements, and at the same time a saving of lime and carbonic acid, be attained.

I claim—

1. The process of purifying raw sugar-juices which consists in adding to the juices in a suitable receptacle a pulverulent purifying agent consisting of a mixture of hydroxid of calcium and brick-dust, and then forcing carbonic acid into and through the mixture.

2. The process for purifying raw sugar-juices which consists in heating the juices to about 80° centigrade, mixing therewith a pulverulent purifying agent consisting of two parts of hydroxid of calcium and one part of brick-dust in quantity exceeding one per cent. by weight of the beet-root, and then maintaining constant agitation of the mixture by blowing carbonic acid into and through the same.

In testimony whereof I have hereunto set my hand in presence of two subscribing witnesses.

HENRIETTE BREYER.

Witnesses:
JOSEF RUBARCH,
ALVESTO S. HOGUE.